United States Patent
Saito et al.

(10) Patent No.: US 8,443,946 B2
(45) Date of Patent: May 21, 2013

(54) VEHICLE DISC BRAKE DEVICE

(75) Inventors: Satoshi Saito, Wako (JP); Keishin Tanaka, Wako (JP); Manabu Aiba, Wako (JP); Masanobu Nakayama, Wako (JP); Yukimasa Nishimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 12/669,601

(22) PCT Filed: Jul. 8, 2008

(86) PCT No.: PCT/JP2008/062658
§ 371 (c)(1),
(2), (4) Date: Feb. 15, 2010

(87) PCT Pub. No.: WO2009/014022
PCT Pub. Date: Jan. 29, 2009

(65) Prior Publication Data
US 2010/0193300 A1 Aug. 5, 2010

(30) Foreign Application Priority Data
Jul. 20, 2007 (JP) .................. 2007-189349

(51) Int. Cl.
*F16D 55/18* (2006.01)
*F16D 65/00* (2006.01)

(52) U.S. Cl.
USPC ....................... 188/72.4; 188/73.1

(58) Field of Classification Search
USPC ............. 188/71.1, 72.1, 73.1, 73.31, 73.39, 188/72.4
See application file for complete search history.

(56) References Cited

U.S. PATENT DOCUMENTS
6,056,090 A * 5/2000 Reimann et al. ............ 188/72.1

FOREIGN PATENT DOCUMENTS
| EP | 0 551 868 | 7/1993 |
| GB | 852282 | 10/1960 |
| JP | 01-295032 | 11/1989 |
| JP | 01295032 | * 11/1989 |
| JP | 02-65724 U | 5/1990 |
| JP | 11-082569 | 3/1999 |

* cited by examiner

*Primary Examiner* — Bradley King
*Assistant Examiner* — Vishal Sahni
(74) *Attorney, Agent, or Firm* — Rankin, Hill & Clark LLP

(57) ABSTRACT

A disc brake device in which uneven wear on the brake pads is prevented. Each brake pad has a set pin hole at one end in which a set pin is fitted, and a torque-receiving component for receiving braking torque in the other end. The pistons for pressing the brake pads are composed of first and second pistons. A center of the first piston near the set pin is located further inside from the middle of the sliding range of the brake pads, and the distance from the set pin is extended.

5 Claims, 5 Drawing Sheets ns for pressing a disc rotor with a brake caliper via brake pads; a set pin passing through a set pin hole in each of the brake pads, for movably supporting the brake pads in the axial direction of the disc rotor; and a torque-receiving component for receiving braking torque from the brake pads during braking, wherein the set pin is disposed offset, in relation to the longitudinal center of the brake pads, on the entry side where the disc rotor enters into the brake caliper; and the pistons have a first piston having a center offset on the side near the set pin and toward the center of the disc rotor away from the middle of the sliding range of the disc rotor, and a second piston having a center located toward the torque-receiving component, farther than the first piston from the set pin, and in the middle of the sliding range of the disc rotor.

VEHICLE DISC BRAKE DEVICE

TECHNICAL FIELD

The present invention relates to an improvement in a vehicle disc brake device.

BACKGROUND ART

Disc brake devices in which the disc is pressed by two pistons via pads are conventionally known, as disclosed in Japanese Patent No. 2750862.

The caliper body disclosed in Japanese Patent No. 2750862 is equipped with movable large diameter and small diameter pistons, which are two pistons for pressing the disc plate via brake pads. The brake pads have pad set pins that are held movably in the axial direction of the disc plate and that position the disc plate in the peripheral direction. Braking torque from the brake pads is received by a pair of braking torque-receiving components.

The pad set pins are disposed in the longitudinal center of the brake pads.

The brake pads are composed of pads for sliding against the disc plate and back plates for supporting the pads.

When brake hydraulic pressure is produced and the disc plate is pressed by the large diameter and small diameter pistons via the brake pads to brake the disc plate, the brake pads move in the axial direction of the disc plate while sliding with the pad set pins and the braking torque-receiving components on the large diameter piston side.

Because virtually no braking torque acts on the pad set pin at this time, the pad set pin of the brake pads tends to move in the axial direction of the disc plate more than the braking torque-receiving component side of the brake pads, and the pad set pin side of the brake pads thus tends to undergo more wear than the braking torque-receiving component side of the brake pads; that is, uneven wear tends to develop.

In Japanese Patent No. 2750862, the large diameter piston is disposed near the braking torque-receiving component on the side where the disc plate comes out of the caliper body, and the small diameter piston is disposed on the side where the disc plate enters the caliper body, so that the pressing force with which the brake pads are pressed by the large diameter piston is greater than the pressing force with which the brake pads are pressed by the small diameter piston, suppressing uneven wear on the brake pads. However, the pad set pin and braking torque-receiving component are sometimes farther apart from each other, depending on the caliper body structure, and there is a need to prevent uneven wear on brake pads in these types of structures as well In front wheel disc brake devices for two-wheeled vehicles where, for example, the large diameter piston of the two pistons is actuated by the brake lever on the right side of the handlebar and the small diameter piston is actuated by the brake lever on the left side of the handlebar or a brake pedal along with the piston of the rear wheel brake device, only one or the other of the large diameter piston or small diameter piston is sometimes actuated, which tends to cause uneven wear on a brake pad 11, necessitating some sort of action to prevent such uneven wear.

DISCLOSURE OF THE INVENTION

An object of the invention is to prevent uneven wear on brake pads in a vehicle disc brake device.

According to a first aspect of the present invention, there is provided a vehicle disc brake device which comprises: pis- When each of the brake pads moves toward the disc rotor as the disc rotor is braked, friction force is produced between the set pin and the set pin hole as well as between the torque-receiving component and the brake pads. At that time, virtually no braking torque acts on the set pin, and the friction force between the set pin and the set pin hole is thus lower than the friction force between the torque-receiving component and brake pads.

The set pin side of the brake pads thus tends to move toward the disc rotor more than does the torque-receiving component side of the brake pads.

When the pressing force applied by the piston to the brake pads is relatively low, the set pin side of the brake pads comes into contact with the disc rotor, whereas the torque-receiving component side of the brake pads does not come into contact with the disc rotor; that is, the brake pads becomes inclined in relation to the disc rotor. As a result, uneven wear develops on the brake pads.

When the pressing force applied by the piston to the brake pads is greater, the entire brake pads come into contact with the disc rotor, without the brake pads becoming inclined, but due to differences in the friction force, the pressing force with which the disc rotor is pressed by the set pin side of the brake pads is greater than the pressing force with which the disc rotor is pressed by the torque-receiving component side of the brake pads, resulting in greater wear on the set pin side of the brake pads than on the torque-receiving component side of the brake pads. That is, uneven wear develops on the brake pads.

In view of this, the first piston on the side near the set pin is disposed so that the center is located toward the disc rotor center away from the center of the sliding range of the disc rotor. When this arrangement is adopted, the distance between the first piston and the set pin increases, and the pressing force on the set pin side of the brake pads decreases in conjunction with an increase in the force needed to move the brake pads while the pads slide toward the set pin. In other words, the difference from the pressing force on the torque-receiving component side of the brake pads is lowered to ensure that the angle between the set pin and the first piston center is lower than when the distance between the set pin and the first piston center is shorter. As a result, the brake pads are less likely to become inclined, and the brake pads are less likely to undergo uneven wear.

According to another aspect of the present invention, there is provided a vehicle disc brake device which comprises: pistons for pressing a disc rotor with a brake caliper via brake pads; a set pin passing through a set pin hole in each of the brake pads, for movably supporting the brake pads in the axial direction of the disc rotor; and a torque-receiving component for receiving braking torque from the brake pads during braking, wherein the set pin is disposed offset, in relation to the longitudinal center of the brake pads, on the entry side where the disc rotor enters into the brake caliper; the pistons have a first piston disposed on the side near the set pin, and a second piston disposed toward the torque-receiving component, farther than the first piston from the set pin; and the first piston is formed so as to be operable independently of the second piston, and with a smaller diameter than the second piston, and is disposed apart from a side end on the side near the set pin and an inner peripheral end and an outer peripheral end of the brake pads.

The first piston is disposed apart from the brake pad inner peripheral end, outer peripheral end, and side end so that the first piston is disposed further from the set pin in cases where, for example, the first piston alone presses the brake pads in front wheel disc brake devices of the type in which the first and second pistons can be independently actuated, such as one where the first piston is actuated through the operation of a front wheel brake-operating member and the second piston is actuated through the operation of a rear wheel brake-operating member. As a result, there is less difference in the pressing force on the set pin side of the brake pads and the torque-receiving component side of the brake pads, ensuring more even wear on the brake pads and less likelihood of uneven wear on the brake pads.

The aforementioned side end of the brake pads preferably extends into the range along the surface of the disc rotor. As a result, the area of the first piston of the brake pads will be greater, reducing the surface pressure when the disc rotor is pressed by the first piston via the brake pads, and ensuring less wear on the first piston side of the brake pads. This will result in less difference between the wear on the second piston side of the brake pads and the wear on the first piston side of the brake pads. That is, uneven wear on the brake pads will be less likely to develop. The relationship between the distance L1 and the distance L3 is preferably L1>L3, where L1 is the distance between the first piston and the side end of the brake pad near the first piston, and L3 is the distance between the second piston and the side end of the brake pad near the second piston.

The first piston is furthest from the side end of the brake pad near the first piston so as to be further away from the set pin, and the second piston is closest to the side end of the brake pad near the second piston, that is, nearest the torque-receiving component, so as to minimize the difference between the pressing force by which the disc rotor is pressed by the first piston side of the brake pad and the pressing force by which the disc rotor is pressed by the second piston side of the brake pad, with less likelihood of uneven wear on the brake pads.

The relationship between the distance L1, distance L2, and distance L3 is preferably L1>L2>L3, where L2 is the distance between the first piston and the second piston.

The distance between the first and second pistons is ensured to prevent uneven wear on the brake pads caused by the first and second pistons being too close to each other, and the distance between the first piston and the side end of the brake pad near the first piston is greater than the distance between the first and second pistons to ensure even pressing force throughout the entire brake pads in order to minimize uneven wear.

BEST MODE FOR CARRYING OUT THE INVENTION

Figure 1:
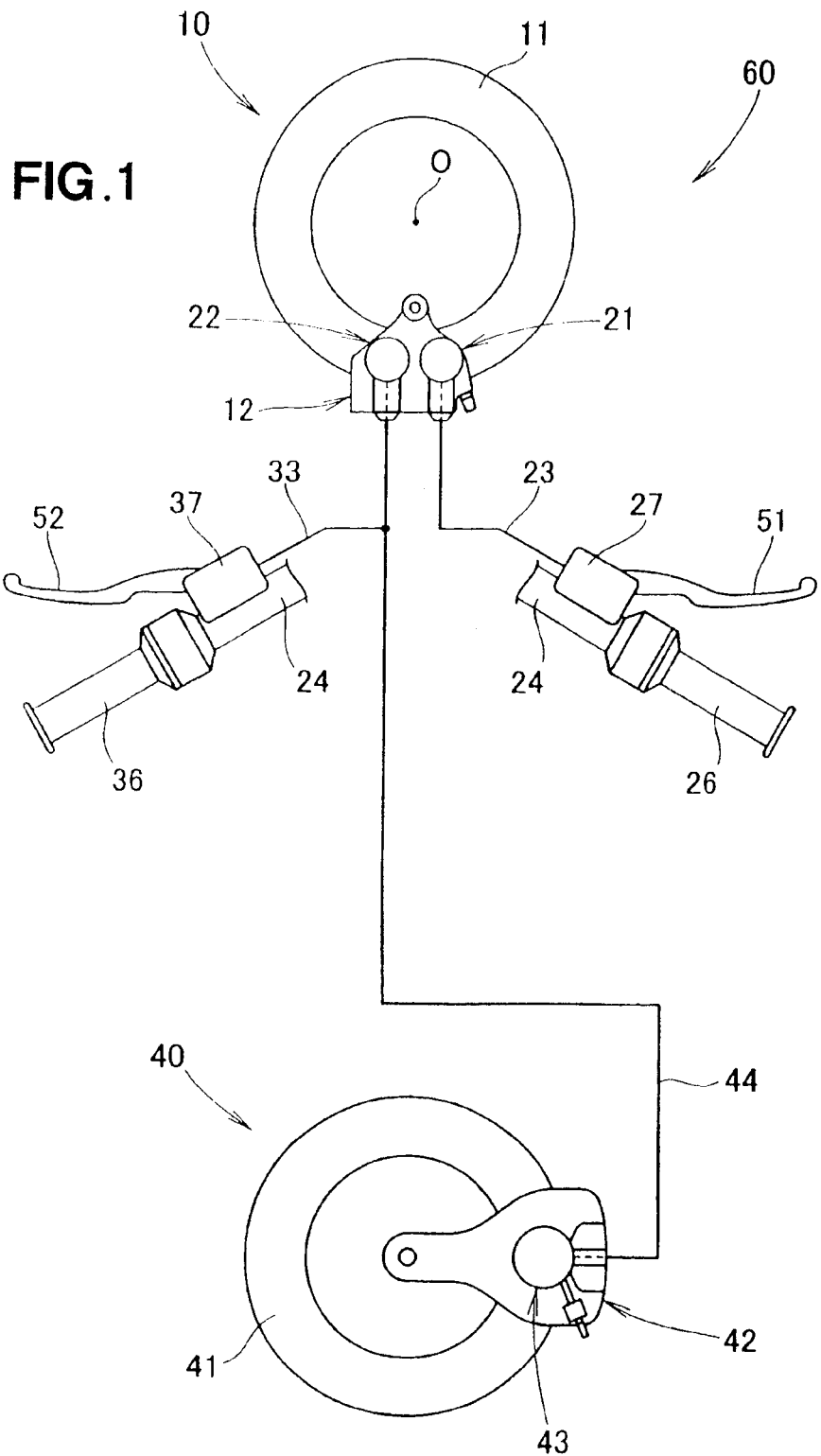
FIG. 1 is a schematic view showing a vehicle front wheel disc brake device according to a first embodiment of the present invention.
Figure 2:
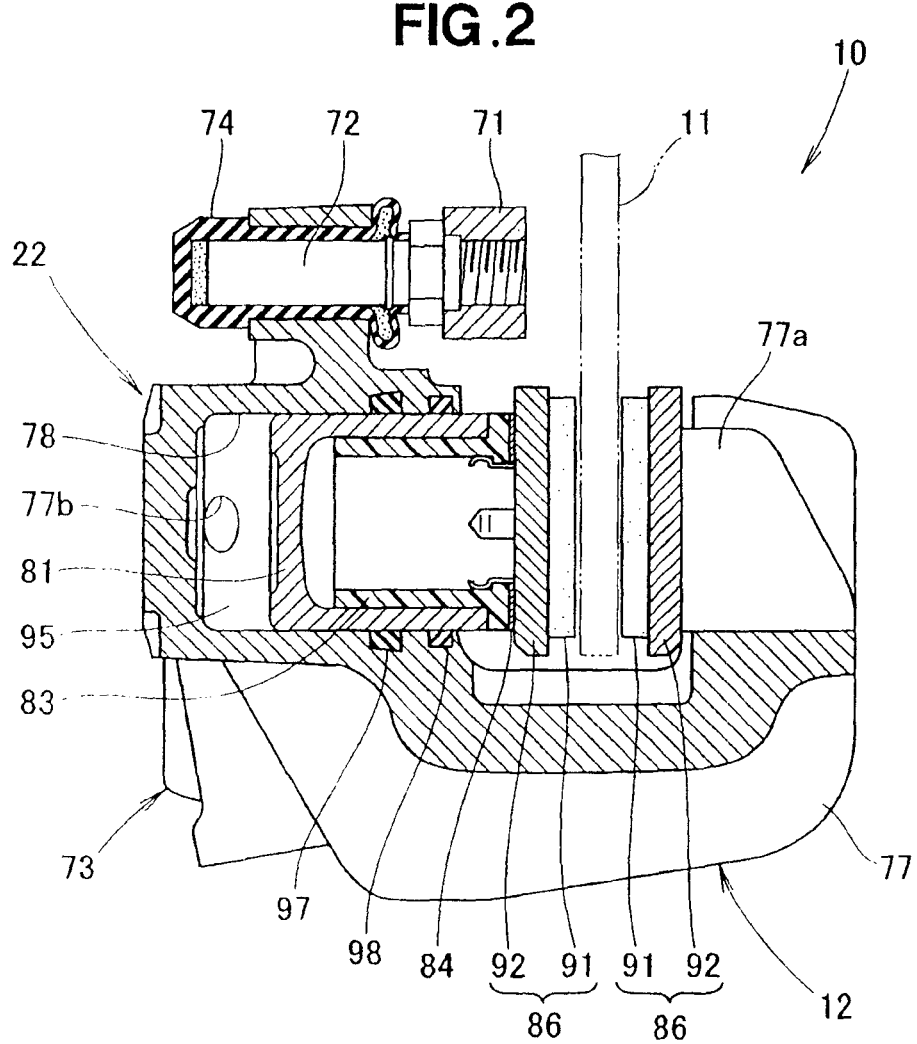
FIG. 2 is a cross-sectional view showing the front wheel disc brake device of FIG. 1.
Figure 3:
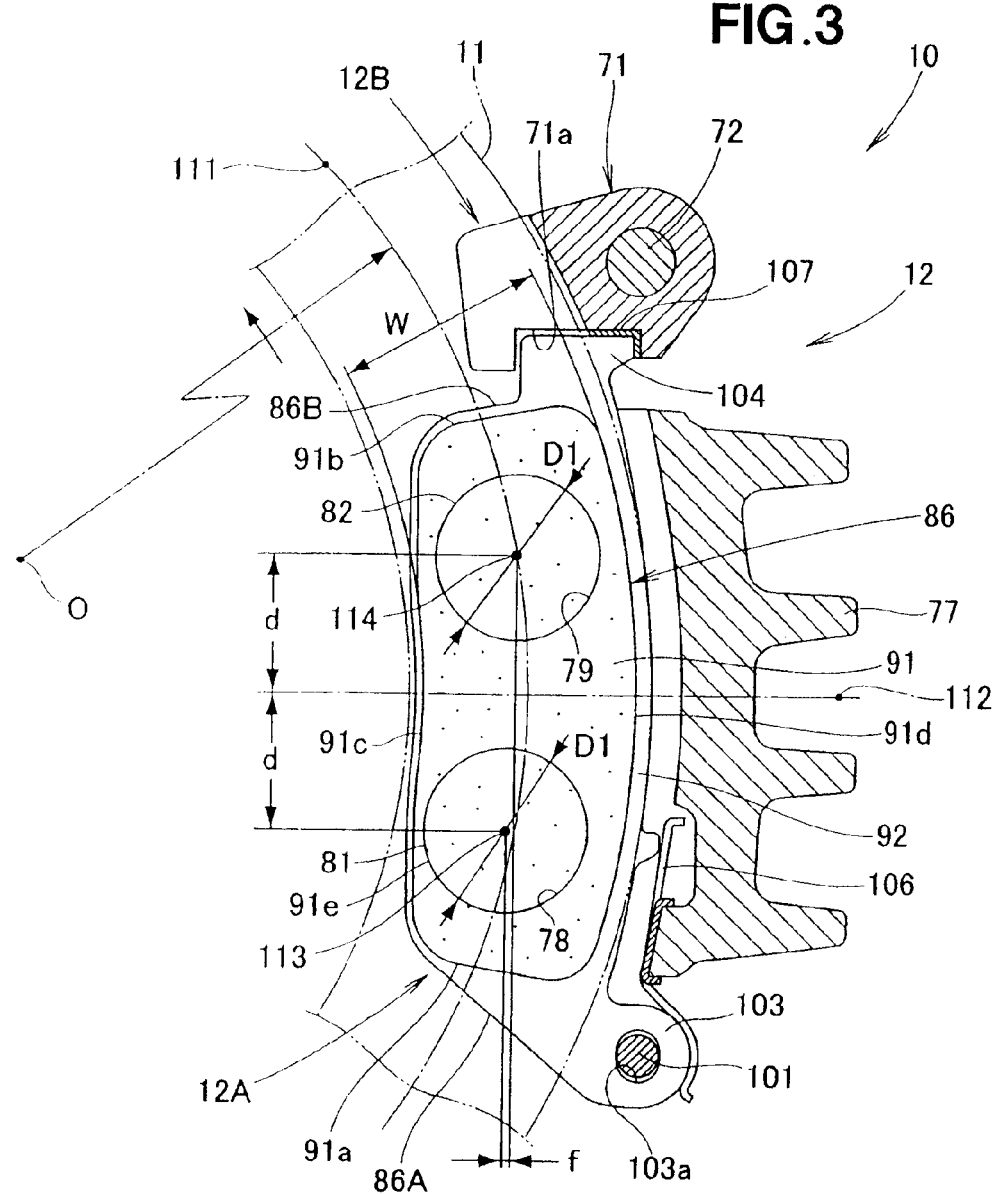
FIG. 3 is a cross-sectional side view showing a brake caliper of the disc brake device of FIG. 1.

Reference is now made to FIGS. 1 to 3 illustrating a disc brake device according to a first embodiment of the present invention.

The front and rear wheel disc brake devices 10, 40 shown in FIG. 1 are drawn horizontally for convenience so as to be more readily understandable.

The front wheel disc brake device 10 includes a disc rotor 11 integrally attached to the front wheel, and a brake caliper 12 for braking the disc rotor 11.

The brake caliper 12 has an upper cylinder component 21 and a lower cylinder component 22. The upper cylinder component 21 is connected by a brake line 23 to a right master cylinder 27 disposed near the right grip 26 of a handlebar 24. The lower cylinder component 22 is connected by a brake line 33 to a left master cylinder 37 disposed near the left grip 36 of the handlebar 24.

The rear wheel disc brake device 40 includes a disc rotor 41 integrally attached to the rear wheel, and a brake caliper 42 for braking the disc rotor 41.

A cylinder component 43 provided in the brake caliper 42 is connected by a brake line 44 to the brake line 33, and is furthermore connected by the brake line 33 to the lower cylinder component 22 of the front wheel disc brake device 10.

A right brake lever 51 is attached to the handlebar 24. The right brake lever 51 is operated to produce hydraulic pressure in the right master cylinder 27, the hydraulic pressure being transmitted through the brake line 23 to the upper cylinder component 21 to brake the disc rotor 11, that is, the front wheel.

A left brake lever 52 is attached to the handlebar 24. The left brake lever 52 is operated to produce hydraulic pressure in the left master cylinder 37, and the hydraulic pressure is transmitted through the brake line 33 to the lower cylinder component 22 to brake the disc rotor 11, that is, the front wheel, while hydraulic pressure in the left master cylinder 37 is also transmitted through the brake line 44 to the cylinder component 43 to brake the disc rotor 41, that is, the rear wheel.

The above front wheel disc brake device 10, right master cylinder 27, left master cylinder 37, rear wheel disc brake device 40, right brake lever 51, left brake lever 52, and brake lines 23, 33, and 44 constitute a CBS (Combined Brake System) 60. The front wheel disc brake device 10 can be individually braked by the right brake lever 51 and left brake lever 52, and the front wheel disc brake device 10 and rear wheel disc brake device 40 can both be braked by the left brake lever 52.

As shown in FIG. 2, the brake caliper 12 of the front wheel disc brake device 10 is composed of a caliper bracket 71 attached to the vehicle body side (such as the front fork supporting the front wheel), a pair of slide pins 72 (only one shown in the figure) attached to the caliper bracket 71, and a caliper assembly 73 slidably attached to the slide pins 72.

A pin boot 74 is provided between the slide pins 72 and caliper assembly 73. The interior of the pin boot 74 is filled with grease.

The caliper assembly 73 is composed of a caliper body 77 having a U-shaped cross section, a first cylinder bore 78 provided in one end of the caliper body 77, a first piston 81 movably inserted into the first cylinder bore 78, a first heat-insulating insulator 83 mounted at the distal end of the first piston 81, a first cover plate 84 attached to the leading end of the first insulator 83 to evenly press the brake pads 86 described below, a second cylinder bore 79 (FIG. 3) provided in one end of the caliper body 77, a second piston 82 (FIG. 3) movably inserted into the second cylinder bore 79, a second heat-insulating insulator (not shown) mounted at the leading end of the second piston 82, a second cover plate (not shown) attached to the leading end of the second insulator to evenly press the brake pads 86, and the pair of brake pads 86, 86 sandwiching the disc rotor 11, which are disposed between the first cover plate 84 and second cover plate and the protruding end 77a provided at the other end of the caliper body 77.

The brake pads 86 are composed of a pad body 91 sliding with the disc rotor 11, and a back plate 92 provided on the back side of the pad body 91 to support the pad body 91.

The symbol 77b indicates a brake fluid channel for feeding and discharging brake fluid that fills a hydraulic chamber 95 formed by the first cylinder bore 78 and first piston 81, and is connected to the brake line 33 (see FIG. 1).

Seal members 97 and 98 mounted on the inner peripheral surface of the first cylinder bore 78 seal off the first cylinder bore 78 and first piston 81.

The above caliper body 77, first cylinder bore 78, first piston 81, first insulator 83, first cover plate 84, and seal members 97 and 98 constitute the lower cylinder component 22.

The upper cylinder member 21 (see FIG. 1) is formed by the cylinder body 77, the second cylinder bore, the second piston 82 (FIG. 3), the second insulator, the second cover plate, and the seal members mounted on the inner peripheral surface of the second cylinder bore 79 to seal off the second cylinder bore 79 and second piston 82. The brake line 23 (see FIG. 1) is connected to a hydraulic chamber (not shown) formed by the second cylinder bore and second piston 82 of the upper cylinder component 21.

As shown in FIG. 3, the pair of slide pins 72 (only one shown) are attached to the caliper bracket 71 of the brake caliper 12. The caliper body 77 is slidably (sliding in the depthwise direction of the page) attached to the slide pins 72. The first piston 81 and second piston 82 are movably (moving in the depthwise direction of the page) provided on the caliper body 77. The brake pads 86 are disposed on the side of the first piston 81 and second piston 82.

A set pin 101 extending in the axial direction of the disc rotor 11 is attached to the bottom of the caliper body 77 to hold the brake pads 86.

A holding component 103 is integrally formed at one end of the back plate 92. A protrusion 104 on the pad side is integrally formed at the other end of the back plate 92. The set pin 101 is passed through an elliptical holding hole 103a formed in the holding component 103. The protrusion 104 on the pad side is fitted to a concave torque-receiving component 71a formed in the caliper bracket 71 to receive the braking torque transmitted from the brake pads 86 when the disc rotor 11 is braked.

To prevent the brake pads 86 from rattling against the caliper body 77, a shim 77 is disposed between the caliper body 77 and back plate 92 and is attached to the caliper body 77. A retainer 107 is provided between the torque-receiving component 71a and the protrusion 104 on the pad side.

When both ends (upper and lower ends) of the brake pads 86 are represented, the side entered by the disc rotor 11 rotating (rotating in the direction in which the vehicle advances) between the pair of brake pads 86, 86 (only one side shown by the symbol 86) will be noted below as the entry side end 86A of the brake pads 86 (91a is the entry side end of the pad body 91), and the side where the disc rotor 11 comes out between the pair of brake pads 86, 86 will be referred to as the exit side end 86B (91b is the exit side end of the pad body 91).

Similarly, the side where the disc rotor 11 enters into the brake caliper 12 (bottom end side of the brake caliper 12) will be referred to as the caliper entry side 12A, and the side where the disc rotor 11 comes out of the brake caliper 12 (upper end side of the brake caliper 12) will be referred to as the caliper exit side 12B.

The first piston 81 and second piston 82 each have an outside diameter D1.

The symbol W indicates the sliding range along which the disc rotor 11 and pad body 91 slide (that is, the range between the inner peripheral end 91c and the outer peripheral end 91d of the pad body 91). The round center line 111 passes through the middle of the above sliding range W and is concentric with the center O of the disc rotor 11. The center line 112 passes through the center O of the disc rotor 11 and through the longitudinal (vertical direction in the figure) middle of the pad body 91. The first piston 81 has a center 113. The second piston 82 has a center 114.

The center 113 of the first piston 81 is offset by a distance f, in relation to the center line 111, toward the center O of the disc rotor 11 from the set pin 101 side in the direction along the center line 112. The center 114 of the second piston 82 is located on the center line 111.

The distance between the center line 112 and the center line 113 of the first piston 81 and the distance between the center line 112 and the center line 114 of the second piston 82 are both d and are equidistant.

The operation of the front wheel disc brake device 10 noted above will be described below.

As the disc rotor 11 rotates in the direction of the arrow in FIG. 3 with the rotation of the front wheel while the vehicle is traveling, the left brake lever 52 (FIG. 1) and right brake lever 51 (FIG. 1) may both be operated to move the first piston 81 and second piston 82 in the depthwise direction of the page, so that the brake pads 86 are pressed to the disc rotor 11 by the pressing force of the first piston 81 and second piston 82, at which time the holding component 103 of the brake pads 86 slides in the depthwise direction of the page to the set pin 101, and the protrusion 104 on the pad side slides in the depthwise direction of the page to the torque-receiving component 71a.

Because a gap is provided between the holding hole 103a and set pin 101, virtually no braking torque acts on the set pin 101, with minimal friction on the holding hole 103a. As the brake pads 86 also tend to rotate in the direction in which the disc rotor 11 rotates, virtually all of the braking torque from the protrusion 104 on the pad side acts on the torque-receiving component 71a, with a considerable increase in friction force between the torque-receiving component 71a and protrusion 104 on the pad side.

The side of the brake pads 86 that faces holding component 103 (located toward the entry side end 86A) thus tends to move in the axial direction (depthwise direction of the page)

of the disc rotor 11, whereas the side of the brake pads 86 that faces the pad side protrusion 104 (located toward the exit side end 86B of rotor rotation) tends not to move in the axial direction of the disc rotor 11.

When the braking torque is low, the low friction force between the set pin 101 and holding hole 103a and the low friction force between the torque-receiving component 71a and protrusion 104 on the pad side allow all of the sliding surface of the pad body 91 of the brake pads 86 to remain in close contact with the sliding surface of the disc rotor 11.

When the braking torque increases, however, the above friction force increases, particularly the friction force between the torque-receiving component 71a and the protrusion 104 on the pad side, so that the side of the brake pads 86 that faces the pad side protrusion 104 tends not to move in the axial direction of the disc rotor 11, and the sliding surface of the exit side end 91b of the pad body 91 does not stay in contact with the sliding surface of the disc rotor 11 or stays in contact with less pressing force.

Furthermore, even if the sliding surface of the entry side end 91a of the pad body 91 remains in contact with the slide surface of the disc rotor 11, the sliding surface of the pad body 91 is inclined in relation to the sliding surface of the disc rotor 11, resulting in an uneven distribution of pressing force on the sliding surface of the pad body 91 and thus uneven wear on the sliding surface of the pad body 91.

The center line 113 of the first piston 81 has therefore been offset by a distance f nearer to the center of the disc rotor 11 (that is, the inside of the center line 111). That is, the first piston 81 moves away from the set pin 101, and the distance therebetween is extended, whereby the angle of incline of the brake pads 86 in the direction of the page surface, as based on the first piston 81, is that much lower, and the brake pads 86 are less likely to become inclined, thereby reducing uneven wear on the sliding surface of the pad body 91.

As noted previously, the disc brake device 10 in the first embodiment is equipped with pistons for pressing the disc rotor 11 with the brake caliper 12 via the pad body 91 as the brake pad, a set pin 101 passing through the holding hole 103a as the set pin hole, for movably supporting the pad body 91 in the axial direction of the disc rotor 11, and a torque-receiving component 71a for receiving braking torque from the pad body 91 during braking.

The set pin 101 is offset, in relation to the middle of the pad body 91, on the caliper entry side 12A where the disc rotor 11 enters into the brake caliper 12. The center 113 of the first piston 81 is located toward the center of the disc rotor 11 from the center line 111 of the sliding range W of the disc rotor 11. The center line 114 of the second piston 82 is located on the center line 111 of the sliding range W of the disc rotor 11.

Because the center 113 of the first piston 81 is in this way further away from the set pin 101, the pressing force with which the side of the pad body 91 that faces the first piston 81 presses the disc rotor 11 is lower than when the center line 113 of the first piston 81 is nearer the set pin 101. There is thus less difference in the pressing force with which the side of the pad body 91 that faces the second piston 82 presses the disc rotor 11, allowing uneven wear on the pad body 91 to be prevented.

Figure 4:
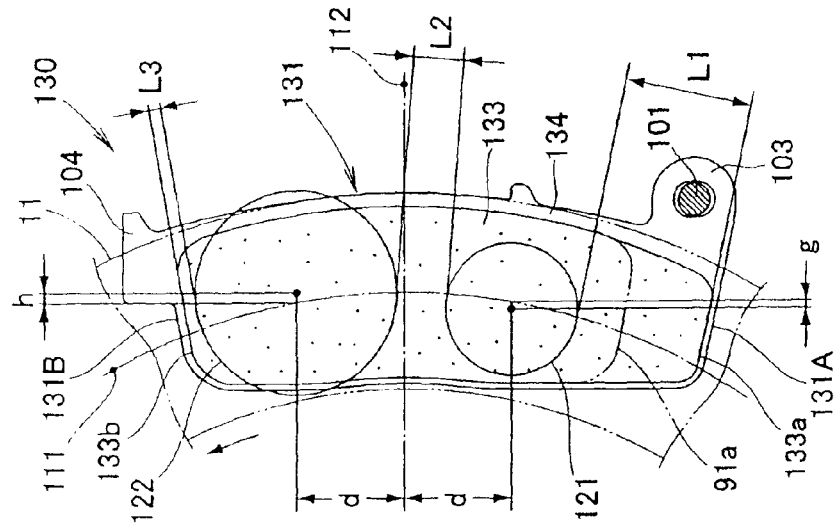
FIG. 4 is a side view showing a brake caliper of a front wheel disc brake device according to a second embodiment of the present invention.

FIG. 4 illustrates a second embodiment of the front wheel disc brake device. Parts that are the same as in the first embodiment in FIG. 3 are indicated by the same symbols and will not be further elaborated.

The front wheel disc brake device 120 in the second embodiment has a disc rotor 11, a brake pad 86, a first piston 121 pressing the brake pad 86 against the disc rotor 11, and a second piston 122.

The outside diameter of the first piston 121 is D1, which is formed smaller than the outside diameter D2 of the second piston 122 (D1<D2). The first piston 121 is actuated along with a piston provided in the rear wheel disc brake device 40 by the operation of the left brake lever 52 shown in FIG. 1. The center 124 of the first piston 121 is offset by a distance g from the center line 111 in the direction of the center O of the disc rotor 11 (toward the inner periphery of the disc rotor 11).

The second piston 122 is actuated by the operation of the right brake lever 51 shown in FIG. 1. The center 126 of the second piston 122 is offset by a distance h from the center line 111 on the side where the set pin 101 is (toward the outer periphery of the disc rotor 11).

The first piston 121 is apart a distance LA from the inner peripheral end 91e of the pad body 91, is apart a distance LB from the outer peripheral end 91d, and is apart a distance LC from the entry side end 91a of the pad body 91. The relationship of the distances LA, LB, and LC is LC>LB>LA. The first piston 121 moves away from the set pin 101 and faces the direction of the center O of the disc rotor 11, and the diameter D2 of the second piston 122 is greater than the diameter D1 of the first piston 121. Therefore, the first piston approaches in the direction of the second piston 122.

As noted above, the front wheel disc brake device 120 in the second embodiment is equipped with pistons 121 and 122 for pressing the disc rotor 11 with the brake caliper 12 via the pad body 91 as the brake pad, a set pin 101 passing through the holding hole 103a as the set pin hole, for movably supporting the pad body 91 in the axial direction of the disc rotor 11, and a torque-receiving component 71a for receiving braking torque from the pad body 91 during braking.

The set pin 101 is offset, in relation to the middle of the pad body 91, on the caliper entry side 12A where the disc rotor 11 enters into the brake caliper 12. The pistons 121 and 122 are composed of the first piston 121 disposed on the side near the set pin 101, and the second piston 122 disposed toward the torque-receiving component 71a (FIG. 3), farther than the first piston 121 from the set pin 101.

The first piston 121 is formed so as to be operable independently of the second piston 122, and with a smaller diameter than the second piston 122. The first piston 121 is disposed apart from the inner peripheral end 91e as the inner peripheral edge of the pad body 91, outer peripheral end 91d as the outer peripheral edge, and entry side end 91a of the pad body 91.

Thus, even when only the first piston 121 presses the pad body 91, the first piston 121 can be disposed further apart from the set pin 101, and the pressing force with which the disc rotor 11 is pressed by the side of the pad body 91 that faces the first piston 121 can be further reduced, preventing uneven wear on the pad body 91.

Figure 5:
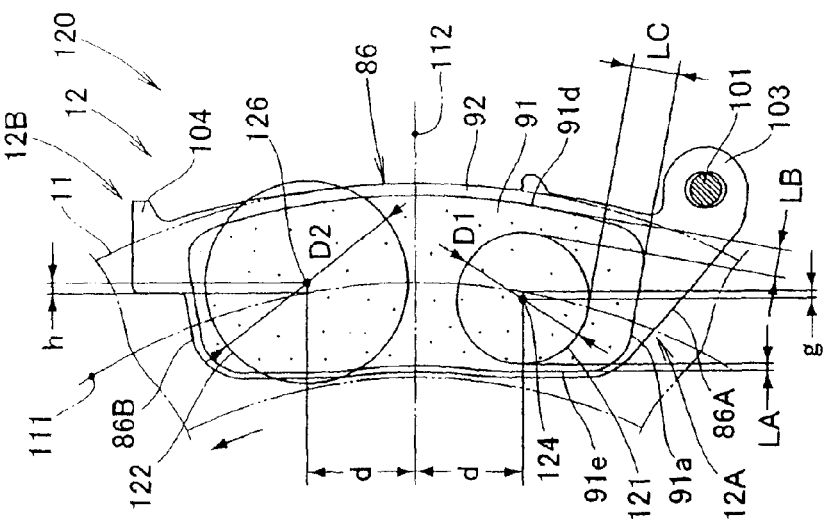
FIG. 5 is a side view showing a brake caliper of a front wheel disc brake device according to a third embodiment of the present invention.

FIG. 5 illustrates a third embodiment of the front wheel disc brake device 130.

The disc brake device 130 in the third embodiment is equipped with a disc rotor 11, brake pad 131 for braking the disc rotor 11, and a first piston 121 and second piston 122 for pressing the brake pad 131 to the disc rotor 11.

The brake pad 131 is composed of a pad body 133 that slides against the disc rotor 11, and a back plate 134 provided on the back surface of the pad body 133 to support the pad body 133. The entry side end 86A of the brake pad 86 shown in FIG. 4 is extended into the range along the disc rotor 11 surface, in other words, is extended into the range overlapping with the disc rotor 11. In short, the entry side end 131A of the brake pad 131 extends lower than the entry side end 86A in the second embodiment.

The reference symbol 131B indicates the exit side end of the brake pad 131, and 133a is the entry side end of the pad body 133. The reference symbol 133b indicates the exit side end (same as the exit side end 91b of the pad body 91 shown in FIG. 3) of the pad body 133.

It is thus possible to expand the pad body 133 sliding surface area with the disc rotor 11, on the side of the brake pad 131 that faces the first piston 121, and to reduce the surface pressure on the sliding surface on the side of the pad body 133 that faces the first piston 121.

Furthermore, the difference in the surface pressure on the sliding surface on the side of the pad body 133 that faces the second piston 122 can be reduced and uneven wear on the pad body 133 can be reduced even when the outside diameter of the first piston 121 is made smaller than that of the second piston 122 to reduce the pressing force produced by the first piston 121 to a lower level than that of the second piston 122.

The symbol L1 in FIG. 5 indicates the distance from the entry side end 133a of the pad body 133 to the first piston 121 The symbol L2 indicates the distance between the first piston 121 and second piston 122. The symbol L3 indicates the distance from the exit side end 133b of the pad body 133 to the second piston 122. The relationship between these distances L1 through L3 is L1>L2>L3.

The relationship L1>L2>L3 allows the first piston 121 and second piston 122 to move away from the set pin 101, and makes it easier for the pad side protrusion 104 of the brake pad 131 to move in the axial direction of the disc rotor 11 to the side of the brake pad 131 that faces the holding component 103. As a result, the incline of the brake pad 131 in relation to the disc rotor 11 can be further reduced, further reducing uneven wear on the pad body 133.

As noted previously, in the front wheel disc brake device 130 of the third embodiment, the side of the pad body 91 that faces the entry side end 91a in the second embodiment shown in FIG. 4 has been extended into the range along the surface of the disc rotor 11 to form the inlet side end 133a as the side end of the pad body 133, so that the area on the side of the pad body 133 that faces the second piston 122 can be made smaller than on the side of the pad body 133 that faces the first piston 121, and the surface pressure can be reduced when the side of the pad body 133 that faces the first piston 121 presses the disc rotor 11, allowing uneven wear on the pad body 133 to be prevented.

Because of the relationship L1>L2>L3 in the invention of the third embodiment, the first piston 121 and second piston 122 can move closer to the torque-receiving component 71a (see FIG. 3) against the pad body 133, and the pressing force on the side of the pad body 133 that faces the torque-receiving component 71a can be further increased, preventing uneven wear on the pad body 133.

Figure 6:
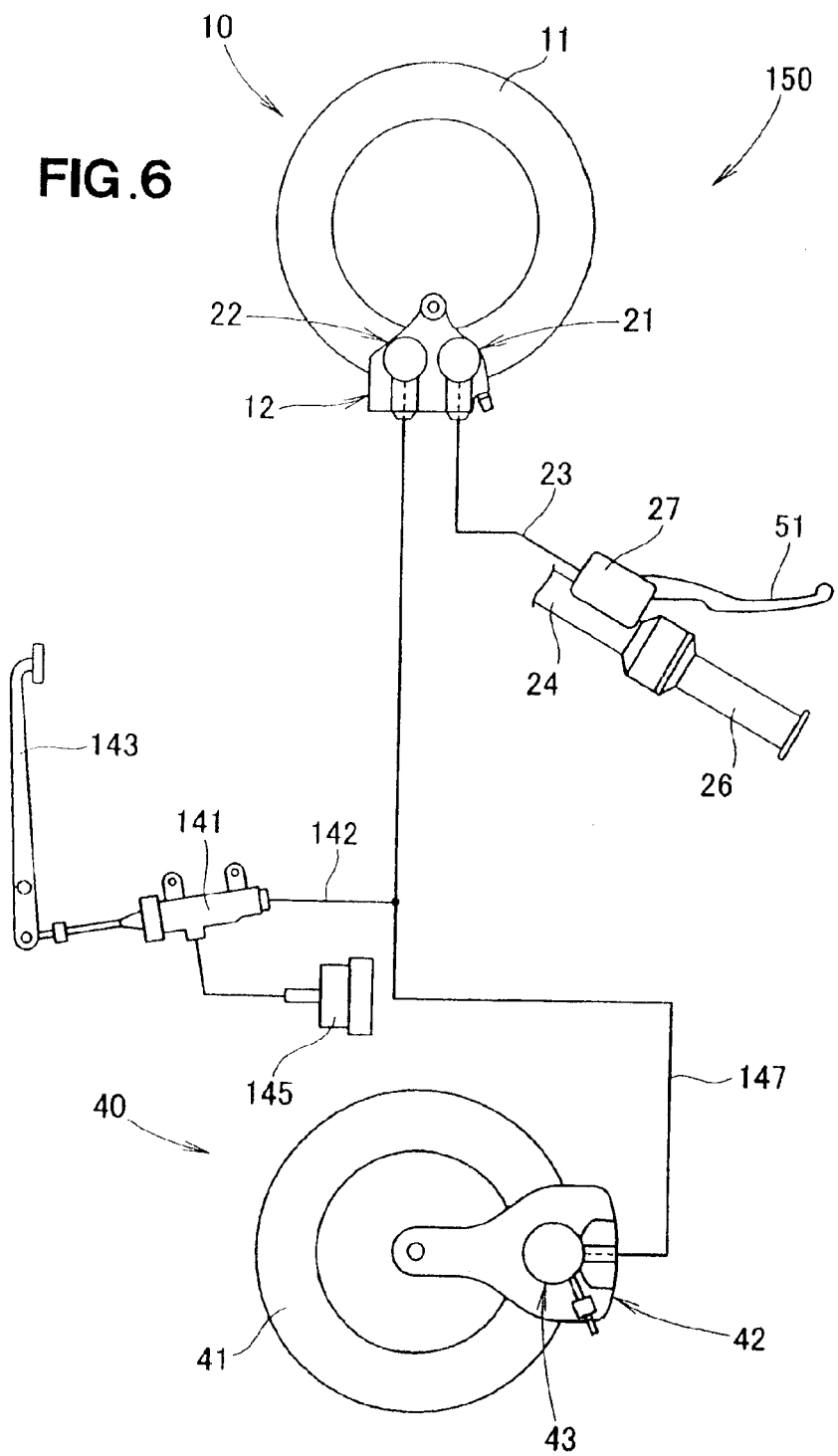
FIG. 6 is a schematic view showing a vehicle disc brake device according to a fourth embodiment of the present invention.

FIG. 6 shows a schematic view of the disc brake device in a fourth embodiment. Parts that are the same as in the embodiment in FIG. 1 are indicated by the same symbols and will not be further elaborated.

The lower cylinder component 22 provided on the brake caliper 12 of the front wheel disc brake device 10 is connected by a brake line 142 to a master cylinder 141 attached to the vehicle body side.

The master cylinder 141 is connected to a brake pedal 143. The brake pedal 143 is operated to produce hydraulic pressure in the master cylinder 141, and the hydraulic pressure is transmitted through the brake line 142 to the lower cylinder component 22, actuating the first piston 81 (FIG. 2) in the lower cylinder component 22 to brake the front wheel. The brake fluid moving in and out of the master cylinder 141 is held in a reservoir tank 145.

The master cylinder 141 is also connected by a brake line 147 to the cylinder component 43 of the rear wheel disc brake device 40. The hydraulic pressure produced in the master cylinder 141 as a result of the operation of the brake pedal 143 is transmitted to the cylinder component 43 and actuates the piston in the cylinder component 43 to brake the rear wheel.

The previously described front wheel disc brake device 10, right master cylinder 27, right brake lever 51, rear wheel disc brake device 40, master cylinder 141, brake pedal 143, and brake lines 23, 142, and 147 constitute the CBS 150.

Braking can be done independently with the right brake lever 51 and brake pedal 143 in the front wheel disc brake device 10, and both the front wheel disc brake device 10 and rear wheel disc brake device 40 can be braked by the brake pedal 143.

In the fourth embodiment, the front wheel brake disc device 10 was in the form of, but is not limited to, the single-sided piston type (floating caliper type) in which a piston is disposed on only one side of the brake rotor in the same manner as in the first embodiment shown in FIG. 2, and may also be in the form of an opposed piston type (stationary caliper type) in which pistons are disposed on both sides of the brake rotor Furthermore, the rear wheel brake device was in the form of, but is not limited to, a disc brake as shown in FIG. 1, and may also be in the form of a hydraulic drum brake.

The disc brake device of the invention may be a dual independent type in which the first and second pistons are independently operated, or a single independent type in which the first and second pistons are operated simultaneously.

INDUSTRIAL APPLICABLITY

The vehicle disc brake device of the invention is suitable for two-wheeled vehicles.

The invention claimed is:
1. A vehicle disc brake device comprising:
a disc rotor;
a brake caliper holding brake pads, said brake pads having a longitudinal center and having an entry side at which said disc rotor enters said caliper and an exit side at which said disc rotor exits said caliper;
first and second pistons for pressing the brake pads against the disc rotor;
a set pin passing through a set pin hole in each of the brake pads, for movably supporting the brake pads in an axial direction of the disc rotor; and
a torque-receiving component for receiving a braking torque from the brake pads during braking,
wherein the set pin is disposed on one side of said longitudinal center of the brake pads offset from the longitudinal center of the brake pads away from a center of the disc rotor and on the entry side of said brake pads;
wherein said first piston has a center that is offset from said longitudinal center of said brake pads toward the center of the disc rotor, such that said first piston center is disposed at a location away from a middle of a sliding range of the disc rotor;
wherein said second piston has a center offset from said longitudinal center of said brake pads such that said second piston is located on said one side of said longitudinal center of said brake pads so as to be offset from the longitudinal center of the brake pads away from a center of the disc rotor;
wherein said first and second pistons are operable independently of each other; and, wherein said entry side of said brake pads has an entry side end and said exit side of said brake pads has an exit side end, said entry side end being spaced a first distance from said first piston and said exit side end being spaced a second distance from said second piston, wherein said first distance is greater than said second distance; and, wherein said first piston is spaced a third distance from the second piston, said third distance being less than said first distance and greater than said second distance.

2. A vehicle disc brake device comprising:

a disc rotor defining an axis;

a brake caliper holding brake pads, said brake pads having a longitudinal center, each of the brake pads defining a set pin hole and comprising a pad body for sliding against the disc rotor and a back plate provided on a back surface of the pad body for supporting the pad body, said pad body having an inner peripheral edge facing toward the disc rotor axis, an outer peripheral edge facing away from the disc rotor axis, an entry side end at which said disc rotor enters said caliper, and an exit side end at which said disc rotor exits said caliper;

first and second pistons for pressing the brake pads against the disc rotor;

a set pin passing through the set pin hole in each of the brake pads, said set pin supporting the brake pads for movement parallel to the disc rotor axis and extending parallel to the disc rotor axis, said set pin being disposed radially outwardly of the disc rotor for holding the brake pads;

a torque-receiving component for receiving braking torque from the brake pads during braking;

the set pin being disposed on the entry side end of each pad body and on one side of said longitudinal center of the brake pads, wherein the pad body of the brake pad extends longitudinally of the brake pad in overlapping relationship with the set pin;

and said first piston being formed so as to be operable independently of the second piston, the first piston having a first diameter and said second piston having a second diameter, said first diameter being smaller than said second diameter, wherein said first piston, when viewed in an axial direction of the first piston, is spaced inwardly from the inner peripheral edge, the outer peripheral edge, and the entry side end of the pad body of the brake pads; and, wherein said second piston has a center offset from said longitudinal center of said brake pads such that said second piston center is located on said one side of said longitudinal center of said brake pads; and, wherein the second piston has a diameter that is larger than a distance between said inner peripheral edge and said outer peripheral edge such that the second piston, when viewed in an axial direction of the second piston, projects inwardly toward the disc rotor axis past the inner peripheral edge of the pad body while also projecting outwardly away from the disc rotor axis past the outer peripheral edge of the pad body, while being entirely positioned inwardly of an exit side of the pad body of the brake pads.

3. The disc brake device of claim 2, wherein said back plate includes an inner side end and an outer side end, said inner side end facing toward the disc rotor axis and said outer side end facing away from the disc rotor axis, and wherein the second piston, as viewed in the second piston axial direction, projects outwardly beyond the inner and outer side ends of the back plate.

4. The disc brake device of claim 2, wherein the entry side end of each brake pad is extended within a range along a surface of the disc rotor such that the entry side end extends below said set pin hole.

5. The disc brake device of claim 4, wherein L1 is a distance between the first piston and the entry side end of the pad body, and L3 is a distance between the second piston and the exit side end of the pad body, and wherein the relationship between the distance L1 and the distance L3 is L1>L3.

* * * * *